(12) United States Patent
Allgaeuer et al.

(10) Patent No.: US 11,065,937 B2
(45) Date of Patent: Jul. 20, 2021

(54) HEAT SYSTEM FOR AN ELECTRIC OR HYBRID VEHICLE

(71) Applicant: Bayerische Motoren Werke Aktiengesellschaft, Munich (DE)

(72) Inventors: Christian Allgaeuer, Munich (DE); Thomas Friedrich, Woerthsee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/600,111

(22) Filed: May 19, 2017

(65) Prior Publication Data

US 2017/0253105 A1 Sep. 7, 2017

Related U.S. Application Data

(63) Continuation of application No. PCT/EP2015/078815, filed on Dec. 7, 2015.

(30) Foreign Application Priority Data

Dec. 18, 2014 (DE) .................... 10 2014 226 346.8

(51) Int. Cl.
*B60H 1/14* (2006.01)
*B60H 1/00* (2006.01)
(Continued)

(52) U.S. Cl.
CPC ............. *B60H 1/143* (2013.01); *B60H 1/004* (2013.01); *B60H 1/00278* (2013.01);
(Continued)

(58) Field of Classification Search
CPC .... B60H 1/143; B60H 1/004; B60H 1/00428; B60H 2001/00307; B60H 2001/00928;
(Continued)

(56) References Cited

U.S. PATENT DOCUMENTS 5,305,613 A  4/1994 Hotta et al.
6,047,770 A * 4/2000 Suzuki ............... B60H 1/00007
                                                165/202
(Continued)

FOREIGN PATENT DOCUMENTS

CN   103534539 A    1/2014
DE   603 19 291 T2  2/2009
(Continued)

OTHER PUBLICATIONS

German Search Report issued in counterpart German Application DE 10 2014 226 346.8 dated Feb. 15, 2016 with partial English translation (thirteen (13) pages).

(Continued)

*Primary Examiner* — Tho V Duong
*Assistant Examiner* — Raheena R Malik
(74) *Attorney, Agent, or Firm* — Crowell & Moring LLP (57) ABSTRACT

A heat system for an electric or hybrid vehicle may be operated in multiple operating modes. The heat system includes a cooling circuit having a cooling unit and a heating heat exchanger for heating the interior. The heating heat exchanger is parallel connected to the cooling unit, for forming a heating circuit. At least one heat source is arranged in the cooling circuit for heat output to the cooling circuit. The heat system may also include a refrigeration circuit for heat exchange with the cooling circuit by way of a capacitor, and an evaporator circuit, which can introduce heat to the refrigeration circuit by way of the evaporator.

15 Claims, 3 Drawing Sheets

(51) Int. Cl.
 *B60H 1/32* (2006.01)
 *F01P 7/14* (2006.01)
 *F01P 5/10* (2006.01)

(52) U.S. Cl.
 CPC ..... B60H 1/00385 (2013.01); B60H 1/00428 (2013.01); B60H 1/32284 (2019.05); *B60H 2001/00307* (2013.01); *F01P 7/14* (2013.01); *F01P 2005/105* (2013.01); *F01P 2050/24* (2013.01); *F01P 2060/08* (2013.01)

(58) Field of Classification Search
 CPC ........... B60H 1/32284; B60H 1/00278; B60H 1/00385; F01P 7/14; F01P 2005/105; F01P 2050/24; F01P 2060/08
 USPC .......................................................... 165/41
 See application file for complete search history.

(56) References Cited

U.S. PATENT DOCUMENTS

| | | | | |
|---|---|---|---|---|
| 6,178,760 | B1* | 1/2001 | Tanaka | B60H 1/00392 62/154 |
| 6,347,528 | B1* | 2/2002 | Iritani | B60H 1/00357 62/324.6 |
| 6,640,889 | B1* | 11/2003 | Harte | B60H 1/00885 165/202 |
| 6,732,942 | B1* | 5/2004 | Sangwan | B60H 1/00885 123/142.5 E |
| 8,215,432 | B2* | 7/2012 | Nemesh | B60H 1/00278 180/68.1 |
| 8,516,847 | B2* | 8/2013 | Koh | F24F 5/0017 62/182 |
| 2004/0134217 | A1* | 7/2004 | Itoh | B60H 1/00392 62/324.1 |
| 2005/0067158 | A1* | 3/2005 | Ito | B60H 1/00007 165/204 |
| 2005/0109031 | A1* | 5/2005 | Inaba | B60H 1/00878 60/670 |
| 2005/0167169 | A1* | 8/2005 | Gering | B60H 1/00278 237/12.3 B |
| 2005/0178523 | A1* | 8/2005 | Itoh | B60H 1/00385 165/42 |
| 2006/0005557 | A1* | 1/2006 | Takano | B60H 1/00878 62/238.6 |
| 2006/0080985 | A1* | 4/2006 | Inaba | B60H 1/00885 62/238.6 |
| 2008/0087040 | A1* | 4/2008 | Oshitani | F25B 41/00 62/500 |
| 2008/0245503 | A1* | 10/2008 | Wilson | B60H 1/00371 165/42 |
| 2008/0251235 | A1* | 10/2008 | Zhou | B60H 1/00278 165/41 |
| 2010/0281901 | A1* | 11/2010 | Kawase | B60H 1/00885 62/238.7 |
| 2011/0139397 | A1* | 6/2011 | Haussmann | B60H 1/00278 165/43 |
| 2012/0174602 | A1* | 7/2012 | Olivier | B60H 1/004 62/79 |
| 2012/0205088 | A1 | 8/2012 | Morisita et al. | |
| 2012/0247716 | A1* | 10/2012 | Galtz | B60H 1/00278 165/42 |
| 2013/0020398 | A1* | 1/2013 | Goto | B60H 1/00285 237/12.4 |
| 2013/0074525 | A1* | 3/2013 | Johnston | B60H 1/00278 62/56 |
| 2014/0041826 | A1* | 2/2014 | Takeuchi | B60L 1/02 165/10 |
| 2014/0158322 | A1 | 6/2014 | Homann et al. | |
| 2014/0374081 | A1* | 12/2014 | Kakehashi | B60K 11/02 165/202 |
| 2015/0000331 | A1* | 1/2015 | Jojima | F25B 1/005 62/498 |
| 2015/0040594 | A1* | 2/2015 | Suzuki | B60H 1/00899 62/159 |
| 2015/0128632 | A1* | 5/2015 | Kishita | B60H 1/00271 62/324.6 |
| 2017/0106725 | A1* | 4/2017 | Kim | B60H 1/00428 |
| 2017/0197490 | A1* | 7/2017 | Enomoto | B60H 1/00899 |
| 2017/0253105 | A1* | 9/2017 | Allgaeuer | B60H 1/143 |

FOREIGN PATENT DOCUMENTS

| | | | |
|---|---|---|---|
| DE | 10 2010 009 233 A1 | 9/2010 | |
| DE | 10 2011 108 729 A1 | 1/2013 | |
| DE | 10 2012 010 697 A1 | 12/2013 | |
| DE | 10 2012 108 043 A1 | 5/2014 | |
| DE | 10 2012 217 101 A1 | 6/2014 | |
| DE | 10 2013 006 356 A1 | 10/2014 | |
| DE | 10 2013 205 318 A1 | 10/2014 | |
| DE | 102013006356 A1 * | 10/2014 | ......... B60H 1/00371 |
| JP | 61-27114 A | 12/1986 | |
| WO | WO 2013/023631 A1 | 2/2013 | |

OTHER PUBLICATIONS

International Search Report (PCT/ISA/210) issued in PCT Application No. PCT/EP2015/078815 dated Mar. 15, 2016 with English translation (eight (8) pages).

German-language Written Opinion (PCT/ISA/237) issued in PCT Application No. PCT/EP2015/078815 dated Mar. 15, 2016 (six (6) pages).

Chinese-language Office Action issued in counterpart Chinese Application No. 201580053364.9 dated Oct. 26, 2018 with English translation (17 pages).

* cited by examiner

HEAT SYSTEM FOR AN ELECTRIC OR HYBRID VEHICLE

CROSS REFERENCE TO RELATED APPLICATIONS

This application is a continuation of PCT International Application No. PCT/EP2015/078815, filed Dec. 7, 2015, which claims priority under 35 U.S.C. § 119 from German Patent Application No. 10 2014 226 346.8, filed Dec. 18, 2014, the entire disclosures of which are herein expressly incorporated by reference.

BACKGROUND AND SUMMARY OF THE INVENTION

Presented herein is an inventive heat system for an electric or hybrid vehicle, which heat system is operable in multiple operating modes and has a cooling circuit which has a cooler and, for the purposes of interior compartment heating, a heating heat exchanger, which is connected in parallel with respect to the cooler in order to form a heating circuit, in which, in the cooling circuit, there is arranged at least one heat source for releasing heat to the cooling circuit.

A conventional cooling circuit for a heat system of said type as described for example in DE 10 2012 217 101 A1.

In conventional vehicles, that is to say also in electric or hybrid vehicles, there is provided multiple cooling circuits for various components for which air-conditioning is to be provided. For example, a separation into a low-temperature circuit, referred to for short as LT circuit, and a high-temperature circuit, referred to for short as HT circuit, is known, in which the two circuits each provide air-conditioning for vehicle components in different temperature ranges. The formation of multiple cooling circuits however necessitates, in particular owing to the multiplicity of components and lines, a correspondingly high level of outlay in terms of construction, high costs, and a large structural space requirement.

In order in particular to avoid the disadvantages that arise with the use of multiple separate cooling circuits, DE 10 2012 217 101 A1 proposes a cooling concept for a vehicle in which conventionally separate cooling circuits are combined in one common cooling circuit. Components of the vehicle which are operated either in a low-temperature range or in a relatively high temperature range are then arranged jointly in said common cooling circuit. Here, a dissipation of heat is realized by way of a common cooling device. In one embodiment, a branch line is furthermore provided by way of which a component which is operated in the low-temperature range can be bypassed by virtue of a partial volume stream of the coolant being conducted via the branch line. Additionally, there may be connected in parallel with respect to the cooling device a heating circuit by way of which interior compartment heating can be realized.

One object of the embodiments of the invention is to specify a heat system by way of which optimized heat transfer between different components of the vehicle is made possible. Furthermore, it is the intention for the heat system to be less expensive, and for the weight and structural space requirement thereof to be reduced.

These and other objects are achieved according to the invention by way of a heat system that is designed for use in an electric or hybrid vehicle and is operable in multiple operating modes. Furthermore, the heat system has a cooling circuit which has a cooler and a heating heat exchanger for the purposes of interior compartment heating. The heating heat exchanger is connected in parallel with respect to the cooler in order to form a heating circuit. Furthermore, in the cooling circuit, there is arranged at least one heat source for releasing heat to the cooling circuit. Furthermore, the heat system has a refrigeration circuit, having a condenser and having an evaporator, which are each designed for exchanging heat with the cooling circuit. Here, the condenser is arranged in the heating circuit, and the cooling circuit additionally has an evaporator circuit in which the evaporator and an LT component are arranged. The LT component is in particular a high-voltage battery of the vehicle. One of the operating modes is a first cooling mode in which the evaporator circuit is operable separately and a transfer of heat from the LT component takes place only via the evaporator into the refrigeration circuit.

Some of the advantages achieved with the inventive heat system include the fact that in different operating states of the heat system, and in accordance with the thermal demands on each individual component which is connected to the heat system, optimum air-conditioning for the components is realized. In other words: waste heat that is generated by activated components is firstly dissipated into the cooling circuit and is transmitted from there to components which require heat, that is to say should be heated, in the respective operating mode. Excess heat is then released, in particular collectively, via the cooler to the surroundings of the vehicle, whereby it is advantageously possible to avoid the use of multiple coolers, such as would otherwise be necessary in the case of multiple separate cooling circuits.

In the first cooling mode, it is furthermore the case that cooling of the LT component is possible only via the evaporator, that is to say the coolant stream used for cooling the LT component is not conducted via further heat sources, whereby a particularly efficient absorption of heat occurs at the LT component. By way of the separate operation of the evaporator circuit, it is thus the case in particular that no heat that is possibly released into the cooling circuit by the heat source passes to the LT component. This arrangement is particularly suitable for the cooling of a high-voltage battery, and therefore the LT component may be a high-voltage battery for the drive of the vehicle.

In the cooling circuit, a coolant, for example water or a water-glycol mixture, circulates in correspondingly suitable lines which connect various components of the vehicle to one another for the purposes of cooling and/or heating. Here, the various components are in particular arranged in the cooling circuit either such that they directly exchange heat with the coolant or such that the coolant streams through a suitable heat exchanger which is connected to the cooling circuit. The heat source is a component of said type, and for example an electric drive machine, charging electronics or a generator. Here, it is in particular also possible for the heat source to include multiple components which are connected in series or in parallel with respect to one another in the cooling circuit. The heat source is in particular characterized in that it generates heat during operation, which heat is dissipated by way of the cooling circuit. Here, the heat source is in particular kept in a low-temperature range, for example at approximately 60° C., that is to say in particular the heat source would classically be cooled by way of an LT circuit.

The refrigeration circuit serves in particular as a heat pump, and includes an evaporator, also referred to as chiller, for absorbing heat into the refrigeration circuit, and a condenser, which is for example a water-cooled condenser, for releasing heat from the refrigeration circuit into the cooling circuit. In particular, a compressor is furthermore arranged in the refrigeration circuit upstream of the condenser, and an expansion element is furthermore arranged in the refrigeration circuit downstream of the condenser.

The cooling circuit is in particular formed by the entirety of all lines through which coolant streams and of the components connected thereto. Here, a part of the cooling circuit forms an evaporator circuit, which is thus a sub-unit of the cooling circuit. In particular in the first cooling mode, the LT component is arranged in said evaporator circuit as a heat source, and the evaporator is arranged in said evaporator circuit as a heat sink. Furthermore, the evaporator circuit is operable separately, that is to say a coolant stream circulates in the evaporator circuit, and no inflow or outflow of coolant into or out of the evaporator circuit occurs. In particular, only the LT component and the evaporator are flowed through in succession. It is therefore preferable for a pump to additionally be arranged in the evaporator circuit in order to convey the coolant. During the separate operation of the evaporator circuit, the LT component is thus cooled exclusively by way of the evaporator, and the heat generated by the LT component is thus transferred entirely into the refrigeration circuit. The temperature of the coolant in the separately operated evaporator circuit amounts to for example approximately 15 to 20° C., and is thus in particular lower than in the rest of the cooling circuit.

The heating circuit is in particular formed by virtue of the heating heat exchanger being arranged in parallel with respect to the cooler, in which "parallel" is to be understood in particular to mean that a branching point of the coolant line is arranged upstream of the cooler and of the heating heat exchanger, from which branching point the coolant can be supplied either to the cooler or to the heating heat exchanger. To divide up the coolant stream in a suitable manner, a pump is expediently arranged downstream of the branching point in the heating circuit. The heating heat exchanger serves for heating the interior compartment of the vehicle and is for example in the form of an air/coolant heat exchanger which, for interior compartment heating, is flowed over by air which then absorbs heat from the coolant. The heated air is subsequently caused to flow into the interior compartment.

To provide heat in the heating circuit, the condenser is arranged in said heating circuit. That is to say, heat from the refrigeration circuit is supplied to the heating circuit by way of the condenser, which heat can then be used for interior compartment heating. Owing to the parallel arrangement of cooler and heating heat exchanger, it is however alternatively possible for the corresponding heat to also be released via the cooler to the surroundings, for example if no interior compartment heating is sought.

The distribution of the heat between the various components in the cooling circuit is in particular dependent on the operating mode in which the heat system is operated at a given point in time. For example, in the first cooling mode, particularly efficient cooling of the LT component in the evaporator circuit is realized by virtue of said evaporator circuit being operated separately, as already described above. Furthermore, in said first cooling mode, it is in particular also possible for the heat source to be cooled, that is to say for heat generated by said heat source to be dissipated. Said heat is then in particular supplied directly to the cooler and released from the latter to the surroundings. By contrast, the heat generated by the LT component is firstly released via the evaporator into the refrigeration circuit, and from there, is released via the condenser back into the cooling circuit and finally to the cooler. In this way, particularly efficient and in each case separate cooling of the LT component and of the heat source is realized.

A further one of the operating modes is preferably a first heating mode in which the heating circuit is operable separately and a transfer of heat into the heating circuit takes place only via the condenser. Here, the heating circuit is in particular operable separately in a manner similar to the evaporator circuit already described above. In the heating circuit, the condenser forms a heat source, and the heating heat exchanger forms a heat sink. For example, the condenser heats the coolant to approximately 50 to 60° C., and after a release of heat via the heating heat exchanger, the temperature is correspondingly lower.

In particular, in the first heating mode, no direct transfer of heat takes place from the heat source into the heating circuit, it rather being the case that the heat that is released from the heat source to the coolant is supplied to the evaporator and then passes indirectly via the refrigeration circuit into the heating circuit. In this case, the condenser then constitutes in particular the only heat source in the heating circuit, and any heat required for heating purposes is thus supplied via the refrigeration circuit. This embodiment permits particularly flexible interior compartment heating in that different heat sources can be used depending on the situation. The corresponding heat sources release their heat, collectively, via the evaporator into the refrigeration circuit, and ultimately via the condenser into the heating circuit. Generation of heat is realized for example by way of the heat source or the LT component or, in the case of corresponding demand, also by way of heat absorption from the surroundings via the cooler. That part of the cooling circuit which does not belong to the heating circuit thus forms, in particular, a heat-collecting circuit which, depending on availability and demand, collects heat from the various heat-generating components of the vehicle.

It is then possible for waste heat from the electric drive of the vehicle or waste heat from the high-voltage battery or heat from the surroundings or a combination of these various components to be used for interior compartment heating. The heat that is introduced from the heat source into the cooling circuit, and possibly additional heat that is absorbed from the surroundings via the cooler, is then supplied to indirectly via the evaporator and the condenser to the heating heat exchanger.

Alternatively, a high-voltage battery may be arranged in the refrigeration circuit in parallel with respect to the evaporator. In other words: the high-voltage battery is arranged not in the evaporator circuit but in the refrigeration circuit. In particular, for this purpose, a high-voltage battery heat exchanger is arranged in the refrigeration circuit for the purposes of exchanging heat with the refrigerant. Thus, in the refrigeration circuit the high-voltage battery, like the evaporator, is in particular a heat source. The LT component arranged in the evaporator circuit is then for example a component similar to the heat source; alternatively, however, the evaporator circuit is omitted entirely. In this embodiment, a possible release of heat from the high-voltage battery then takes place firstly to the refrigerant and, from there, indirectly to the condenser, and then possibly to the heating heat exchanger and/or the cooler.

In order to also permit interior compartment cooling, the refrigeration circuit expediently includes an evaporator branch, in which the evaporator is arranged, and an air-conditioning branch, which is parallel to said evaporator branch and which has an air-conditioning evaporator. Said air-conditioning evaporator is for example, similarly to the heating heat exchanger, an air/refrigerant heat exchanger which is flowed over by air and extracts heat from the latter, which heat is then released to the refrigerant. Here, "parallel" is to be understood in particular to mean that a branch is arranged downstream of the condenser, and a first refrigerant stream flows in the direction of the evaporator and a second refrigerant stream flows in the direction of the air-conditioning evaporator. In this way, two parallel branches are formed in which, in particular, in each case one expansion element connected upstream of the evaporator or of the air-conditioning evaporator is then also arranged. Through correspondingly suitable adjustment of the expansion elements, the first and the second refrigerant stream can then be adjusted as required. In particular, the air-conditioning branch is then activatable independently of the evaporator branch, that is to say the interior compartment cooling is possible in accordance with demand, and is performed in particular independently of the absorption of heat into the refrigeration circuit via the evaporator.

It is then also possible, in the first cooling mode, for interior compartment cooling to be performed, and for the heat that is absorbed here into the refrigeration circuit to be released via the condenser to the cooling circuit and ultimately via the cooler to the surroundings.

A hybrid vehicle also has an internal combustion engine in addition to the high-voltage battery. For the air-conditioning for said internal combustion engine, the latter is expediently arranged in a high-temperature circuit, referred to for short as HT circuit, and in a preferred embodiment, the HT circuit is connected to the heating circuit. In other words: like the evaporator circuit and the heating circuit, the HT circuit is a part of the cooling circuit. Since the HT circuit is connected to the heating circuit, an inflow and outflow of coolant takes place only via the heating circuit. Owing to the direct connection of the HT circuit to the heating circuit, particularly efficient utilization of the waste heat from the internal combustion engine is also made possible. When the internal combustion engine is active, the waste heat that it generates is then fed directly into the heating circuit, and is available there for interior compartment heating as required, or is alternatively dissipated entirely or partially via the cooler. The HT circuit then acts, in particular in addition to the condenser, as a heat source for the heating circuit.

The HT circuit may be connected downstream of the condenser. Since the internal combustion engine, during operation, is possibly operated at a temperature higher than the temperature of the coolant in the condenser, the connection of the internal combustion engine downstream of the condenser permits the simultaneous release of heat from both components into the cooling circuit. For example, the inlet temperature of the coolant at the condenser is approximately 60° C. or less, and the outlet temperature at the internal combustion engine is over 100° C. Owing to such a corresponding temperature difference, the coolant therefore expediently flows firstly through the condenser, absorbs heat there from the refrigeration circuit, thereupon flows through the relatively hot internal combustion engine, and absorbs additional heat in the HT circuit.

For particularly optimum setting of the temperature of the coolant streaming to the internal combustion engine, a part of the coolant is branched off downstream of the internal combustion engine and is recirculated to a mixing point downstream of the condenser and upstream of the internal combustion engine. The heated coolant then impinges there on relatively cold coolant, is mixed therewith, and is used again for the temperature control of the internal combustion engine. For example, the coolant exits the condenser at a temperature of approximately 80 to 90° C., and impinges, at the mixing point, on coolant at a temperature of approximately 105° C., such that coolant at a temperature of approximately 95° C. is supplied to the engine. The corresponding volume streams, and thus the temperatures, are preferably adjustable by way of suitable valves and/or suitable actuation of pumps arranged in the cooling circuit, such that an optimum adaptation to the respective operating situation is possible.

In order to achieve a particularly flexible heat distribution in the heat system even when an internal combustion engine is active, a further operating mode is a second cooling mode in which the evaporator circuit is operable separately and a dissipation of heat from the HT circuit, that is to say in particular of waste heat from the internal combustion engine, takes place via the cooler. In the case of such engine cooling, coolant is then introduced from the heating circuit into the HT circuit, for example by activation of an HT pump arranged in the HT circuit. Downstream of the internal combustion engine, the HT circuit is then in turn connected to the heating circuit, such that heated coolant is supplied to the heating circuit and, depending on demand, can either be used for interior compartment heating and/or is released, for the cooler, to the surroundings. If the internal combustion engine is used as a heat source, a partial dissipation of heat via the cooler is possibly expedient because, although a high admission temperature of for example approximately 100° C. is ideal for heating purposes, this however possibly cannot be realized in an efficient manner, in particular if the cooling demand at the internal combustion engine is greater than the heating demand in the interior compartment.

In particular in combination with the above-described recirculation to a mixing point, the remaining, that is to say non-recirculated coolant stream downstream of the internal combustion engine is then used either for the interior compartment heating or is conducted to the cooler for release of heat to the surroundings. The recirculating branch to the mixing point is in particular simultaneously part of the heating circuit and of the HT circuit. Depending on whether engine cooling is performed, the flow direction of the coolant in said section is reversed. This dual use yields a particularly compact structural form.

Owing to the fact that the evaporator circuit is operable separately, in this operating mode, the LT component is in particular optionally coolable, in which, in a cooling situation, the corresponding heat passes firstly via the evaporator into the refrigeration circuit and then via the condenser into the heating circuit. From there, a suitable distribution of the waste heat in accordance with demand is then performed, similarly to the case already described above of the first cooling mode. Furthermore, by way of the operation of the evaporator circuit separately, it is also ensured that, in the second cooling mode, no coolant that has been heated by the internal combustion engine leads to possibly undesired heating or reduced cooling of the LT component.

A further operating mode may be a second heating mode in which the interior compartment heating is realized by transfer of waste heat from the HT circuit, that is to say in particular of the internal combustion engine, to the heating heat exchanger. When the internal combustion engine is active, heat is then released to the coolant, said heated coolant is supplied to the heating circuit, and there, in turn, released from the heating heat exchanger to the interior compartment air that is to be heated. Any heat that is not required can then, in a particularly simple manner, be branched off in the direction of the cooler and dissipated to the surroundings. It is also the case in the second heating mode, as in the first heating mode, that, in addition to the heat from the internal combustion engine, it is also possible for heat from the heat source, and heat from the LT component that is introduced into the heating circuit via the condenser, to be supplied to the heating heat exchanger. Regardless of which of said components actually releases heat to the cooling circuit, optimum interior compartment heating is advantageously ensured in all situations.

Since, during the operation of the internal combustion engine, at least the latter already outputs waste heat, it may be provided that, in the second heating mode, cooling of the LT component in the evaporator circuit is performed only as required, and thus the temperature of said LT component can be optimally set.

An auxiliary cooler may be arranged in the HT circuit downstream of the internal combustion engine. Said auxiliary cooler may in particular be arranged in the HT circuit and not in the heating circuit, and preferably upstream of a possible branch for the recirculation of the coolant upstream of the internal combustion engine. In this way, it is possible, during the cooling of the internal combustion engine, from the cooler to be relieved of load by virtue of a part of the heat generated by the internal combustion engine being released to the surroundings via the auxiliary cooler already before the coolant is introduced into the heating circuit.

In order to permit starting operation of the internal combustion engine in particular proceeding from the second heating mode, it is advantageously the case that, in the HT circuit, between the internal combustion engine and auxiliary cooler, there is arranged an HT branch for recirculation of coolant to the internal combustion engine, in particular similarly to the branch to the mixing point as already described above. Said HT branch permits a recirculation of heated coolant before said coolant releases heat in the auxiliary cooler. In particular, by way of the HT branch, an HT circuit can be formed which is closed off with respect to the rest of the cooling circuit and in particular also with respect to the heating circuit, that is to say a separately operable HT circuit in which the coolant streams, as required, only through the internal combustion engine, whereby the latter is heated.

To further improve the flexibility of the heat system, a rear-end ventilation cooler may be arranged downstream of the cooler and upstream of the evaporator. Said rear-end ventilation cooler firstly permits an additional absorption of heat from air which is discharged from the interior compartment of the vehicle into the surroundings; here, the rear-end ventilation cooler acts as a heat source and permits a particularly efficient recovery of heat from already-heated interior compartment air, which heat is then in turn used, by way of the downstream evaporator, for interior compartment heating as required. Secondly, with correspondingly cool interior compartment air, it is possible for the rear-end ventilation cooler to be operated as a heat sink, and for heat from the heat source, which is connected upstream or alternatively downstream of the rear-end ventilation cooler, to be dissipated via the interior compartment air which is discharged from the interior compartment into the surroundings. In this mode, the rear-end ventilation cooler thus advantageously relieves the cooler of load.

For the operation of the internal combustion engine, the latter is possibly supplied with charge air, in which prior cooling of the charge air normally leads to an increase in efficiency of the internal combustion engine. Therefore, a charge-air cooler may be connected to the cooling circuit, in which the charge-air cooler is preferably arranged in the evaporator circuit in parallel with respect to the LT component. In particular indirect charge-air cooling is then possible, analogously to the cooling of the LT component. To activate and deactivate the cooling of the LT component and that of the charge-air cooler in accordance with demand and independently of one another, suitable valves are arranged in the evaporator circuit.

A further operating mode may be a charging mode in which a dissipation of heat from the LT component takes place via the cooler, in which the LT component is in particular a high-voltage battery. Here, the vehicle is in particular not in operation, and no energy is extracted from the high-voltage battery, with the latter rather being charged. The heat that possibly arises here is released to the cooling circuit and is conducted from there to the cooler and is dissipated to the surroundings. It may likewise be the case that operation of charging electronics that are provided additionally generates heat, which is then released via the cooler. Here, the refrigeration circuit is in particular not active, therefore no transfer of heat takes place from the cooling circuit into the refrigeration circuit.

In particular, further advantages arise from a combination of some or all of the various features mentioned above. For example, there may be numerous heat sources available at the same time for interior compartment heating, specifically the high-voltage battery, the rear-end ventilation cooler, that is to say heat from the air exiting the interior compartment, electrical drive components and, if the cooling medium is supercooled at the outlet of the evaporator to below the ambient temperature of the vehicle, also heat from the surroundings via the cooler. Furthermore, in the case of a hybrid vehicle, the internal combustion engine, which would otherwise classically be arranged in a separate high-temperature circuit, can be utilized as a heat source. In addition to the cooling of the high-voltage battery, it is furthermore possible, if said high-voltage battery is arranged as an LT component in the cooling circuit, for heating of the high-voltage battery to be heated by way of heat introduced into the cooling circuit. Through this possibility of air-conditioning for the high-voltage battery, the latter can advantageously be operated at an optimum temperature.

Even if the cooler ices up at particularly low ambient temperatures, the other heat sources already mentioned remain available for the interior compartment heating. Furthermore, in particular in one of the cooling modes, the release of heat from the various heat sources in the cooling circuit, in particular from the LT component and from the internal combustion engine, leads to corresponding heating of the coolant in the cooling circuit, whereby an iced-up cooler is automatically thawed. A self-regulating heat system is thus advantageously realized which counteracts icing-up of the cooler.

By virtue of the refrigeration circuit merely being equipped as a particularly simple heat pump, with a condenser, evaporator, compressor and expansion element, and with an evaporator for interior compartment cooling, it is possible for said refrigeration circuit to be designed to be particularly compact, and in this way for the required structural space to be reduced, and for the production costs for the refrigeration circuit to be kept low. The compactness furthermore has the advantageous effect that only little refrigerant is required. Since in each case several heat sources and heat sinks are preferably provided in the cooling circuit, the heat system is also particularly robust with regard to failure of individual components, because corresponding cooling and heating tasks can be correspondingly distributed, and the available heat is distributed in accordance with demand.

Other objects, advantages and novel features of the inventive heat system will become apparent from the following detailed description of one or more preferred embodiments when considered in conjunction with the accompanying drawings, in which:

DETAILED DESCRIPTION OF THE DRAWINGS

FIGS. 1 to 5 show a heat system 2. The heat system 2 serves for thermal management in a hybrid vehicle (not illustrated in any more detail), hereinafter also referred to generally as vehicle. Here, each of FIGS. 1 to 5 illustrates an operating mode of the heat system 2. Said heat system includes a cooling circuit 4 and a refrigeration circuit 6, in which the lines of the refrigeration circuit 6 are illustrated as dashed lines; the solid lines represent the lines of the cooling circuit 4. Those line sections of the cooling circuit 4 through which coolant streams in a given operating mode are illustrated in bold in the respective figure. Furthermore, the flow direction of the coolant is indicated in FIGS. 1 to 5 by arrows.

The refrigeration circuit 6 is in the form of a heat pump and includes primarily a compressor 8, a condenser 10, an expansion element 12 and an evaporator 14. These four components are arranged in series in an evaporator branch 16 of the refrigeration circuit 6. In parallel with respect to said evaporator branch 16, the refrigeration circuit 6 has an air-conditioning branch 18, in which a further expansion element 12 is arranged, and an air-conditioning evaporator 20, which in this case serves for the cooling of air in the interior compartment of the vehicle, that is to say for interior compartment cooling. Thus, heat is absorbed into the refrigeration circuit 6 via the air-conditioning evaporator 20 and the evaporator 14, and heat is released from the refrigeration circuit 6 by way of the condenser 10.

The cooling circuit 4 is thermally connected, for the exchange of heat, to the refrigeration circuit 6 by way of the condenser 10 and the evaporator 14. Consequently, during operation, heat is then extracted from the cooling circuit 4 and supplied to the refrigeration circuit 6 by way of the evaporator 14, and heat is transferred from the refrigeration circuit 6 into the cooling circuit 4 by way of the condenser 10.

In the cooling circuit 4, there are in turn arranged multiple components of the vehicle which are to be cooled and/or heated. Depending on the operating mode, said components constitute a heat source or a heat sink or are deactivated entirely. As illustrated, there is firstly arranged in the cooling circuit 4 a cooler 22 for the exchange of heat with the air in the surroundings, that is to say the air in the surroundings outside the vehicle. For the conveying of the coolant, a pump 24*a* is arranged downstream of the cooler 22. The condenser 10 is arranged downstream of said pump, and as shown here, a component of the vehicle denoted generally as a heat source 26 may be arranged in parallel with respect to said condenser. Here, the heat source 26 is for example charging electronics, an electric drive machine or a generator of the vehicle. When the heat source 26 is activated, it generates heat which is dissipated by way of the cooling circuit 4. For this purpose, the heat source 26 is connected in a suitable manner, for example by way of a suitable heat exchanger, to the cooling circuit 4. Below, too, the expression "connected to the cooling circuit" is to be understood to mean that the corresponding component is suitably connected for the exchange of heat with the coolant of the cooling circuit, for example by way of a heat exchanger through which or around which the coolant streams.

Furthermore, a heating heat exchanger 28 is arranged in the cooling circuit 4 for the purposes of interior compartment heating. Said heating heat exchanger, in particular in combination with the air-conditioning evaporator 20, forms an air-conditioning unit (not illustrated in any more detail) in the vehicle. Furthermore, the two components are in this case arranged in series such that inflowing air flows firstly over the air-conditioning evaporator 20 and subsequently over the heating heat exchanger 28. By way of this arrangement, it is then possible for inflowing air to be firstly dehumidified and subsequently heated.

The heating heat exchanger 28 and the condenser 10 are furthermore arranged in a heating circuit 30 which is part of the cooling circuit 4. Here, the heating heat exchanger 28 is in particular connected in parallel, in relation to a branching point 32, with respect to the cooler 22. During operation, it is then possible for the volume stream of the coolant to be divided up, and supplied to the cooler 22 and/or to the heating heat exchanger 28, by way of a control valve 34.

In the cooling circuit 4 there is furthermore arranged an LT component 36, which in this case is in particular a high-voltage battery of the vehicle. The LT component 36 forms, with the evaporator 14, an evaporator circuit 38. In this evaporator circuit, a charge-air cooler 40 is arranged additionally, and in parallel, with respect to the LT component 36. Here, the coolant stream that circulates in the evaporator circuit 38 is divided up, in accordance with demand, between the LT component 36 and the charge-air cooler 40 by way of a valve 42*a*. Here, a shut-off valve 44*a* is additionally arranged downstream of the LT component 36. For the conveying of the coolant, the evaporator circuit 38 furthermore includes a pump 24*b*.

A rear-end ventilation cooler 46 may be arranged downstream of the heat source 26 and upstream of the evaporator 14. During operation, said rear-end ventilation cooler is flowed over by air which is released from the interior compartment of the vehicle into the surroundings. Depending on the respective operating mode, it is then possible by way of said rear-end ventilation cooler 46 either for heat to be released to the discharged air or for heat to be absorbed from said air into the cooling circuit 4.

The heat system 2 shown in FIGS. 1 to 5 is a heat system 2 for a hybrid vehicle. As already mentioned above, the LT component 36 is in this case a high-voltage battery for supplying energy to an electrical drive component. Furthermore, the hybrid vehicle includes an internal combustion engine 48, which is likewise integrated into the cooling circuit 4. For this purpose, the internal combustion engine 48 is arranged in an HT circuit 50, that is to say a high-temperature circuit. The latter is part of the cooling circuit 4, and in this case is connected to the heating circuit 30. Here, "connected" is to be understood in particular to mean that a coolant inflow into the HT circuit 50 and an outflow out of said HT circuit take place only via the heating circuit 30. For the conveying of coolant through the HT circuit 50, a pump 24*c* is arranged therein.

As shown, there is furthermore arranged in the HT circuit 50 an auxiliary cooler 52 via which heat can be dissipated from the cooling circuit 4 into the surroundings. A valve 42*b* is arranged upstream of the auxiliary cooler 52 for the purposes of supplying the coolant stream in the HT circuit 50 partially or entirely back to the internal combustion engine 48 via an HT branch 54.

Figure 1:
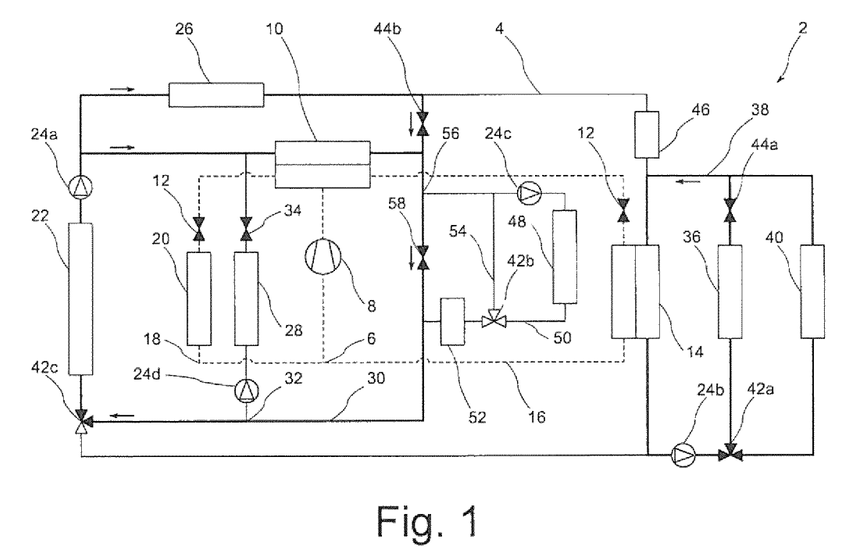
FIG. 1 is a heat system in a first cooling mode.

FIG. 1 shows the heat system 2 in a first cooling mode. Here, the evaporator circuit 38 is operated separately, and cooling of the LT component 36, and also of the charge-air cooler 40 when the internal combustion engine 48 is active, is realized exclusively by way of the evaporator 14. An exchange of coolant with the remaining part of the cooling circuit 4 is not realized here. The heat is supplied via the refrigeration circuit 6 to the condenser 10, and is transferred from there into the cooling circuit 4 again. Subsequently, the heat is then transported to the cooler 22 and released to the surroundings. In the situation illustrated here, in the first cooling mode, the heat source 26 is also cooled. The heat that is generated by the heat source 26 is, via the cooling circuit 4, likewise supplied to the cooler 22. In this case, the heating circuit 30 is deactivated, and interior compartment cooling is additionally possible by way of the air-conditioning evaporator 20. The internal combustion engine 48 and the HT circuit 50 are likewise deactivated.

Proceeding from the first cooling mode, preheating of the internal combustion engine 48 is additionally also possible. For this purpose, the pump 24c is activated such that coolant that has absorbed heat from the condenser 10 and/or from the heat source 26 is supplied to the initially still relatively cold internal combustion engine 48, and releases heat there.

Figure 2:
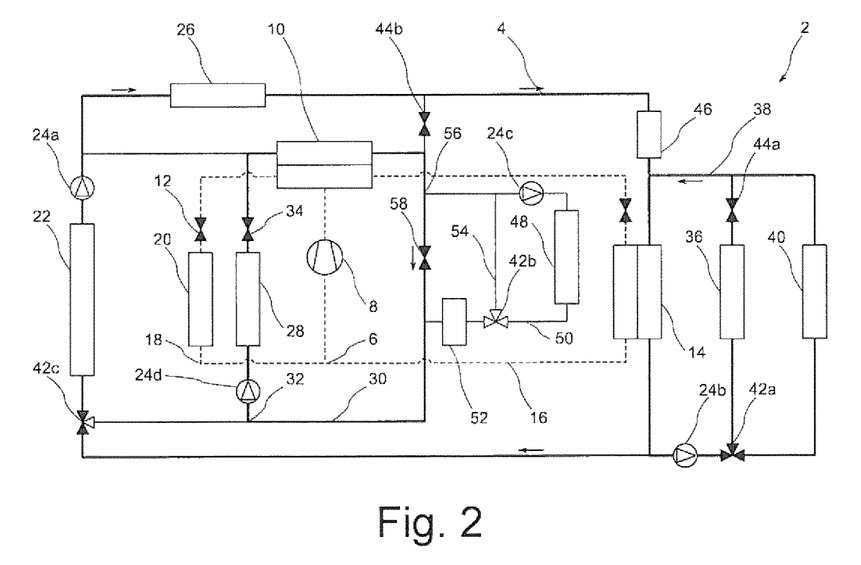
FIG. 2 is the heat system in a first heating mode.

FIG. 2 illustrates a first heating mode of the heat system 2. Here, the evaporator circuit 38 is in particular not operated separately. Furthermore, the control valve 34 is open, that is to say the heating circuit 30 is activated and coolant streams through the heating heat exchanger 28, and therefore interior compartment heating is performed. Here, the heating circuit 30 is operated separately, and the heat used for the interior compartment heating is supplied to the heating circuit 30 exclusively by way of the condenser 10 from the refrigeration circuit 6. For the conveying of the coolant in the heating circuit 30, a pump 24d is also activated in this operating mode. The heat provided by the condenser 10 originates indirectly from the further components arranged in the cooling circuit 4. As shown here, heat may be absorbed into the cooling circuit 4 in particular by way of the heat source 26, by way of the rear-end ventilation cooler 46, by way of the LT component 36 and, when the internal combustion engine 48 is active, also by way of the charge-air cooler 40. The heat released by said components is transferred, collectively, by way of the evaporator 14 into the refrigeration circuit 6. In particular, by contrast to the first cooling mode of FIG. 1, a shut-off valve 44b arranged downstream of the heat source 26 is closed, whereby the coolant stream passing the heat source 26 is conducted in the direction of the evaporator 14, and not to the heating circuit 40.

In this case, too, the selected arrangement of the LT component 36 relative to the evaporator 14 ensures that coolant which firstly passes the heat source 26 and the rear-end ventilation cooler 46 releases heat already via the evaporator 14 before passing the LT component 36. In other words: the evaporator 14 is positioned upstream of the LT component 36, whereby improved cooling of said LT component 36 is achieved. Downstream of the evaporator 14, a partial stream of the coolant is conveyed by way of the pump 24b in the evaporator circuit 38, and the remaining coolant stream is conducted to the cooler 22, via which heat is released to the surroundings. For this purpose, a valve 42c positioned upstream of the cooler is in particular switched such that coolant is supplied to the cooler 22 only from the evaporator 14 and from the evaporator circuit 38, and not from the heating circuit 30. Alternatively, depending on the ambient conditions and depending on the amount of waste heat available from other components, it is also possible in this operating mode for heat to be absorbed into the cooling circuit 4 from the surroundings by way of the cooler 22.

Figure 3:
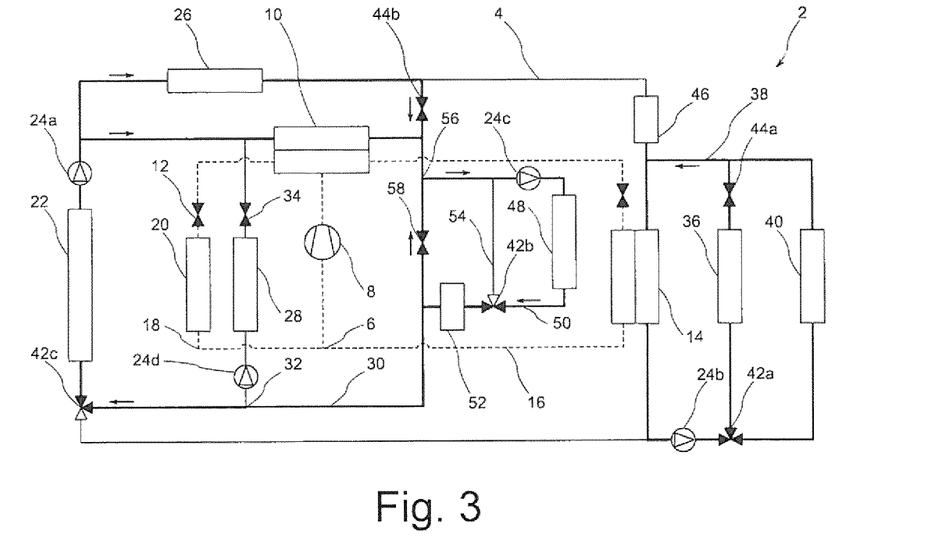
FIG. 3 is the heat system in a second cooling mode.
Figure 4:
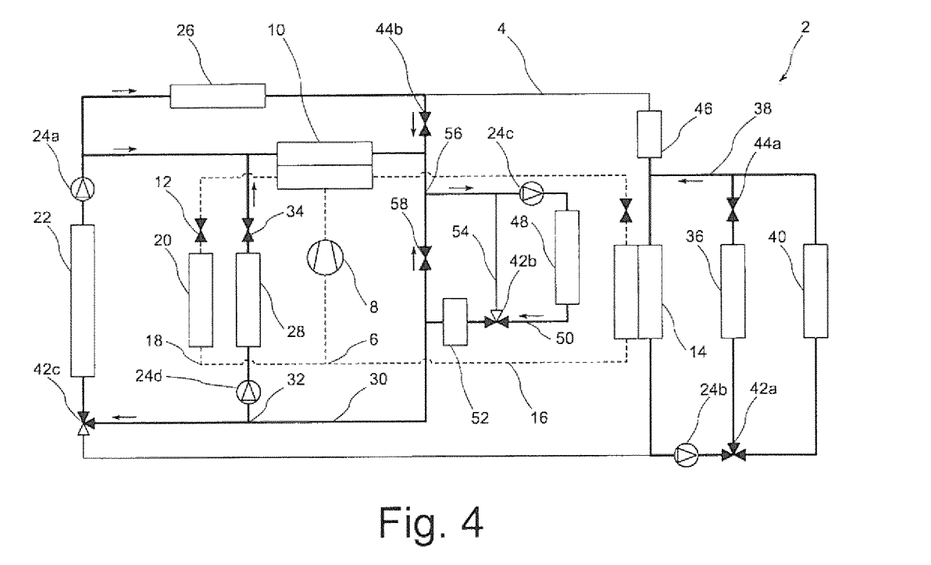
FIG. 4 is the heat system and a second heating mode.

FIGS. 3 and 4 each show an operating mode in which the internal combustion engine 48 of the motor vehicle is active, by contrast to the operating modes illustrated in FIGS. 1 and 2.

FIG. 3 illustrates a second cooling mode in which, in addition to the separate operation of the evaporator circuit 38, cooling of the internal combustion engine 48 is also performed. For this purpose, the HT circuit 50 is active, and, downstream of the condenser 10 at a mixing point 56, the coolant is conveyed by way of the pump 24c the heating circuit 30 into the HT circuit 50 and is supplied to the internal combustion engine 48. As shown here, the valve 42b may additionally be switched such that the HT branch 54 is not used, but rather the coolant stream circulating in the HT circuit 50 is supplied entirely to the auxiliary cooler 52. Downstream of the auxiliary cooler 52, a part of the coolant stream is recirculated via a throttle valve 58; the remaining part is supplied to the cooler 22. Accordingly, both the LT component 36 and the internal combustion engine 48 are cooled. Here, the heating circuit 30 is inactive. Interior compartment cooling by way of the air-conditioning evaporator 20 is optionally also possible.

For the warm-up of the internal combustion engine 48, it is possible for the HT branch 54 to be used by virtue of the valve 42b being switched correspondingly. A part of the coolant is then branched off upstream of the auxiliary cooler 52 and supplied at a corresponding temperature to the internal combustion engine 48, which can thereby be heated. Alternatively, the valve 42b may be switched such that no coolant is conducted onward to the auxiliary cooler 52 and to the heating circuit 30; the HT circuit 50 is then operated separately, and thus no active exchange of coolant takes place with the rest of the cooling circuit 4.

FIG. 4 shows a second heating mode in which the waste heat from the internal combustion engine 48 is supplied to the heating circuit 30 and is used for interior compartment heating by way of the heating heat exchanger 28. For this purpose, the pump 24d is correspondingly activated, and the control valve 34 is switched such that, at the branching point 32, a partial volume stream of the coolant remains in the heating circuit 30, whereas the remaining coolant stream is conducted to the cooler 22. Depending on requirements, it is also possible for the entire coolant stream to be conducted, at the branching point 32, to the heating heat exchanger 28.

Owing to the operation of the HT circuit 50 in FIGS. 3 and 4, the coolant in this case flows via the throttle valve 58 in the opposite direction in relation to the direction in the operating modes shown in FIGS. 1 and 2. This is attributable in particular to different actuation of the pump 24c.

Figure 5:
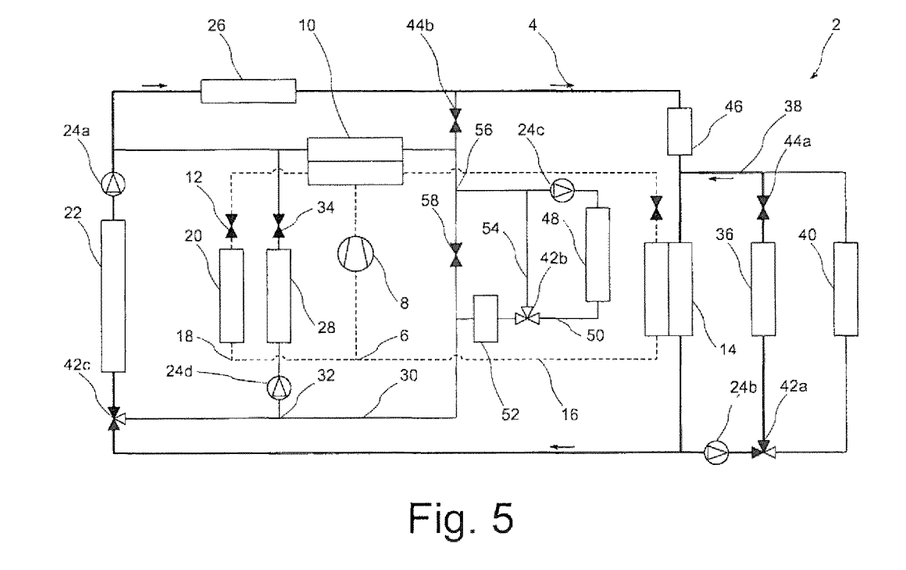
FIG. 5 is the heat system in a charging mode.

FIG. 5 shows the heat system 2 in a charging mode in which the LT component 36 is a high-voltage battery which is being charged. The heat that is generated here is released to the cooling circuit 4 and is dissipated via the cooler 22. Furthermore, in this operating mode, it is also possible for heat that is generated by the heat source 26, for example waste heat from the charging electronics, to likewise be dissipated via the cooler 22. Since the internal combustion engine 48 is in this case inactive, the charge-air cooler 40 is in particular not flowed through by coolant; for this purpose, the valve 42a is switched correspondingly.

As shown, the LT component 36 may be the high-voltage battery of the hybrid vehicle. In an alternative embodiment which is not shown here, the high-voltage battery is however integrated not into the cooling circuit 4 but into the refrigeration circuit 6, specifically in parallel with respect to the evaporator 14. Here, heat is then correspondingly released directly to the refrigerant.

LIST OF REFERENCE DESIGNATIONS

2 Heat system
4 Cooling circuit
6 Refrigeration circuit
8 Compressor
10 Condenser
12 Expansion element
14 Evaporator
16 Evaporator branch
18 Air-conditioning branch
20 Air-conditioning evaporator
22 Cooler
24a, 24b, 24c, 24d Pump
26 Heat source
28 Heating heat exchanger
30 Heating circuit
32 Branching point
34 Control valve
36 LT component
38 Evaporator circuit
40 Charge-air cooler
42a, 42b, 42c Valve
44a, 44b Shut-off valve
46 Rear-end ventilation cooler
48 Internal combustion engine
50 HT circuit
52 Auxiliary cooler
54 HT branch
56 Mixing point
58 Throttle valve The foregoing disclosure has been set forth merely to illustrate embodiments of the inventive heat system and is not intended to be limiting. Since modifications of the disclosed embodiments incorporating the spirit and substance of the inventive heat system may occur to persons skilled in the art, the inventive heat system should be construed to include everything within the scope of the appended claims and equivalents thereof

What is claimed is:

1. A heat system for an electric or hybrid vehicle that is operable in multiple operating modes, the heat system comprising:
   a cooling circuit which has a cooler and;
   a heat exchanger configured to heat an interior compartment, the heat exchanger being connected in parallel with respect to the cooler in order to form a heating circuit, wherein
      in the cooling circuit, there is arranged at least one heat source configured to release heat to the cooling circuit,
      a refrigeration circuit is formed, having a condenser and having an evaporator which are each designed for exchanging heat with the cooling circuit,
      the condenser is arranged in the heating circuit,
      the cooling circuit additionally has an evaporator circuit in which the evaporator and a low-temperature (LT) component are arranged, and
      one of the operating modes is a first cooling mode in which the evaporator circuit is operable separately, such that a coolant stream circulates in the evaporator circuit and no inflow or outflow of coolant into or out of the evaporator circuit occurs,
      the cooling circuit, the refrigeration circuit, and a cooling circuit of the LT component share the same evaporator, and
      the LT component is connected in parallel to the same evaporator.

2. The heat system as claimed in claim 1, wherein a further one of the operating modes is a first heating mode in which the heating circuit is operable separately without any other heating circuit and a transfer of heat into the heating circuit takes place only via the condenser.

3. The heat system as claimed in claim 2, wherein a high-voltage battery is arranged in the refrigeration circuit in parallel with respect to the evaporator.

4. The heat system as claimed in claim 3, wherein the refrigeration circuit comprises an evaporator branch, in which the evaporator is arranged, and an air-conditioning branch, which is parallel to said evaporator branch and which has an air-conditioning evaporator and which serves for interior compartment cooling.

5. The heat system as claimed in claim 4, wherein a high-temperature (HT) circuit is connected to the heating circuit for the purposes of air-conditioning for an internal combustion engine which is arranged in the HT circuit.

6. The heat system as claimed in claim 5, wherein the HT circuit is connected downstream of the condenser.

7. The heat system as claimed in claim 6, wherein a further operating mode is a second cooling mode in which the evaporator circuit is operable separately without any other evaporator circuit and a dissipation of waste heat from the HT circuit takes place via the cooler.

8. The heat system as claimed in claim 7, wherein a further operating mode is a second heating mode in which the interior compartment heating is realized by transfer of waste heat from the HT circuit to the heating heat exchanger.

9. The heat system as claimed in claim 8, wherein in the second heating mode, cooling of the LT component in the evaporator circuit is performed.

10. The heat system as claimed in claim 9, wherein an auxiliary cooler is arranged in the HT circuit downstream of the internal combustion engine.

11. The heat system as claimed in claim 10, wherein in the HT circuit, between the internal combustion engine and the auxiliary cooler, there is arranged an HT branch for recirculation of coolant to the internal combustion engine.

12. The heat system as claimed in claim 11, wherein a rear-end ventilation cooler is arranged downstream of the cooler and upstream of the evaporator.

13. The heat system as claimed in claim 12, wherein a charge-air cooler is arranged in the evaporator circuit in parallel with respect to the LT component.

14. The heat system as claimed in claim 13, wherein a further operating mode is a charging mode in which a dissipation of heat from the LT component takes place via the cooler.

15. The heat system as claimed in claim 1, wherein a transfer of heat from the LT component into the refrigeration circuit takes place only via the evaporator.

* * * * *